United States Patent
Duning et al.

[11] Patent Number: 5,209,682
[45] Date of Patent: May 11, 1993

[54] SPEED AND DIRECTION INDICATOR FOR SHIPS

[75] Inventors: Ulrich Duning, Koblenz; Reinhold Knecht, Rhens; Siegfried Lais, Spay, all of Fed. Rep. of Germany

[73] Assignee: Schottel-Werft Josef Becker GmbH & Co. KG, Spay, Fed. Rep. of Germany

[21] Appl. No.: 648,595

[22] Filed: Jan. 31, 1991

[51] Int. Cl.$^5$ .................. B63H 25/42; G06F 15/50
[52] U.S. Cl. ........................ 440/2; 318/588; 340/984; 364/424.01; 73/178 R
[58] Field of Search ............ 116/265, DIG. 43; 440/2; 114/144 R; 340/984; 73/178 R; 364/443; 318/588

[56] References Cited
U.S. PATENT DOCUMENTS 4,129,087 12/1978 Dimmick et al. ........ 116/DIG. 43
4,220,111 9/1980 Krautkremer et al. ..... 114/144 E X
4,444,143 4/1984 Tattersall et al. ............. 114/144 R
4,664,052 5/1987 Burns et al. ................... 114/144 E
4,836,809 6/1989 Pelligrino ....................... 440/2 X
5,043,727 8/1991 Ito ................................. 340/984 X
5,115,398 5/1992 De Jong ......................... 364/443

Primary Examiner—Daniel M. Yasich
Attorney, Agent, or Firm—Fiddler Levine & Mandelbaum

[57] ABSTRACT

A speed and direction indicator for ships having at least one rudder propeller, or pump jet, and preferably several such devices for determining the direction of the ship and its speed in the selected direction. An optical display is provided in the area occupied by the ship operator, on which display are shown the angle which is formed between the direction of force and a reference direction, and the strength of the thrust, independently of the operating state of the rudder propeller(s) or the pump jet(s).

13 Claims, 2 Drawing Sheets

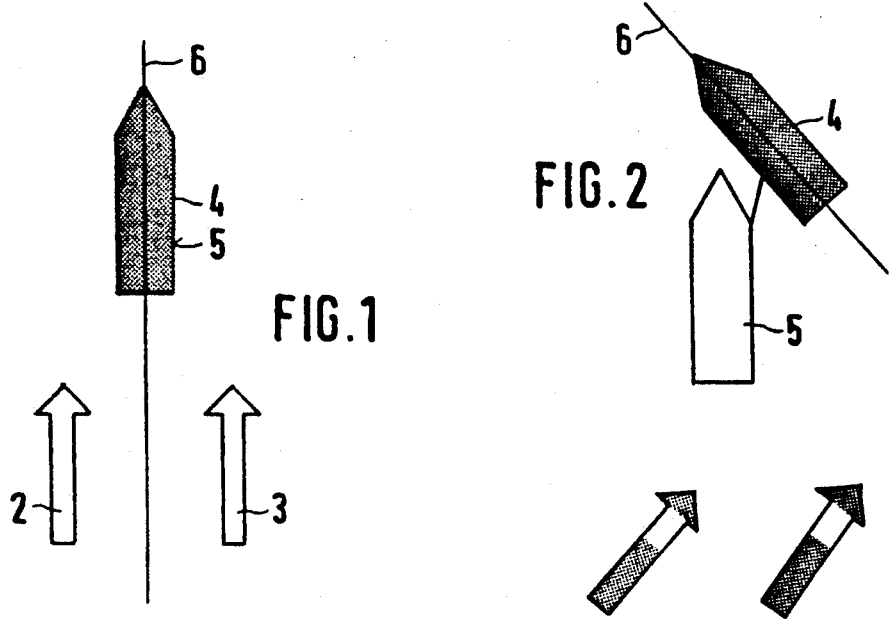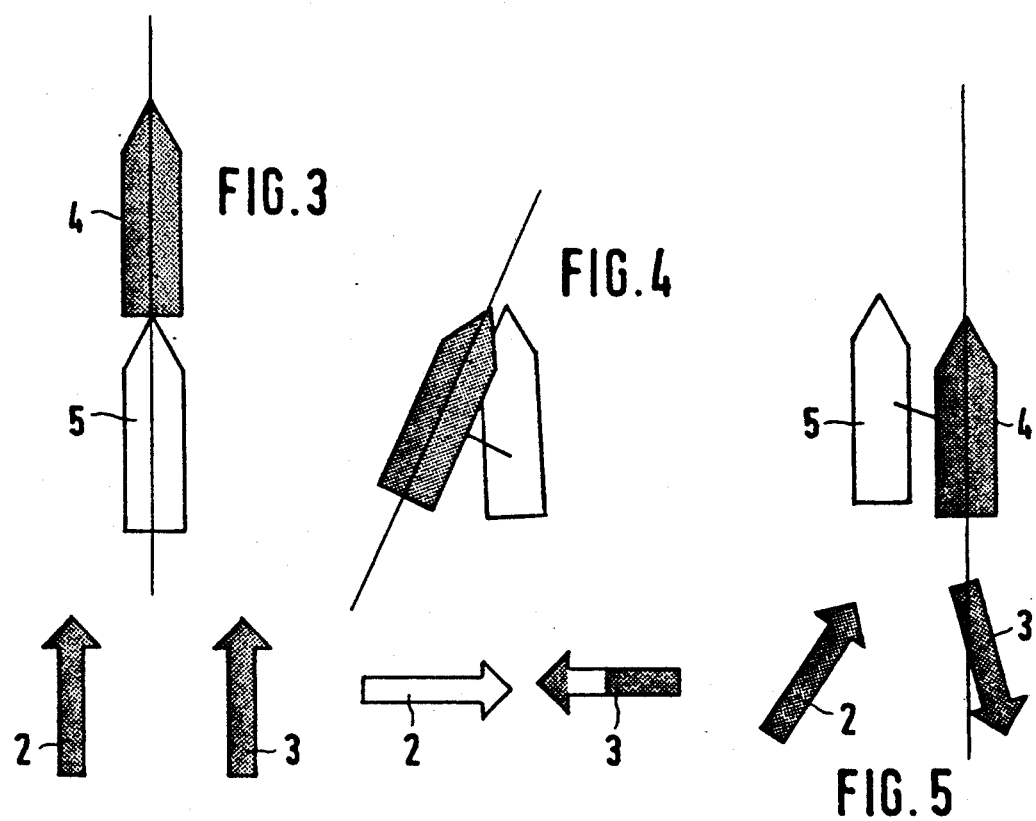

SPEED AND DIRECTION INDICATOR FOR SHIPS

BACKGROUND OF THE INVENTION

In a ship with engine-driven propellers for generating the propulsion, and a rudder facility for determining the direction of the propulsion of the ship, the relationship between the initiation and the result of the change in the criteria for the motion of the ship can be recognized without much difficulty by the ship operator. If a change in the direction is occasioned by an adjusting lever or, in the case of older installations, by a handwheel, then the change in the adjusting lever and the change in the direction of travel always correspond to one another. If the ship operator changes the lever position in order to change the direction of travel to starboard, the result of adjusting the lever can be anticipated readily. An adjustment of the lever, which does not lead to the desired result, is practically inconceivable.

On the other hand, if rudder propellers or pump jets are used to propel or steer a ship, the relationships are much more complicated. Particularly when several rudder propellers or pump jets, which can be adjusted individually and independently of one another, are used. The effect of adjusting the rudder propellers or pump jets is much more difficult to anticipate and possible only for an experienced ship operator. This is due to owing to the fact that almost any change in the propulsion direction of the ship is achievable by means of the adjusting motions of the driving units, which is, after all, the main advantage of such propulsion facilities. This difficulty originates particularly from the fact that, with respect to the number of revolutions and the ejection direction of the water jet produced, some adjusting motions of several rudder propellers or pump jets lead to changes in the motion of the ship, which are different from those that are to be expected without detailed knowledge. As a consequence of this, only well-trained ship operators, who practice constantly, can be used for such ships. Even these operators can make steering mistakes, if they are faced with a different situation, for which they are not prepared.

SUMMARY OF THE INVENTION

It is an object of the invention to take this circumstance into account and to enable even a ship operator who is less used to handling ships propelled by rudder propellers or pump jets to sail and steer such ships without danger. The operator requires only a brief familiarization to successfully control the ship, even when the operator is confronted by a situation which does not permit him much time to deliberate about the propulsion changes that are required.

This objective is accomplished by the characterizing features of the claims and is explained in greater detail in the following by means of the drawing.

DESCRIPTION OF THE DRAWINGS

FIG. 1 is view of a representation on the display of the apparatus of the preferred embodiment of the invention installed in the environment of ship at rest.

FIG. 2 is a view of the display of FIG. 1 showing a state of motion of the ship in which the apparatus of the preferred embodiment of the invention is installed.

FIG. 3 is a view of the display of FIG. 1 showing another state of motion of the ship in which the apparatus of the preferred embodiment of the invention is installed.

FIG. 4 is a view of the display of FIG. 1 showing still another state of motion of the ship in which the apparatus of the preferred embodiment of the invention is installed.

FIG. 5 is a view of the display of FIG. 1 showing a further state of motion of the ship in which the apparatus of the preferred embodiment of the invention is installed.

DESCRIPTION OF THE PREFERRED EMBODIMENT OF THE INVENTION

Figure 6:
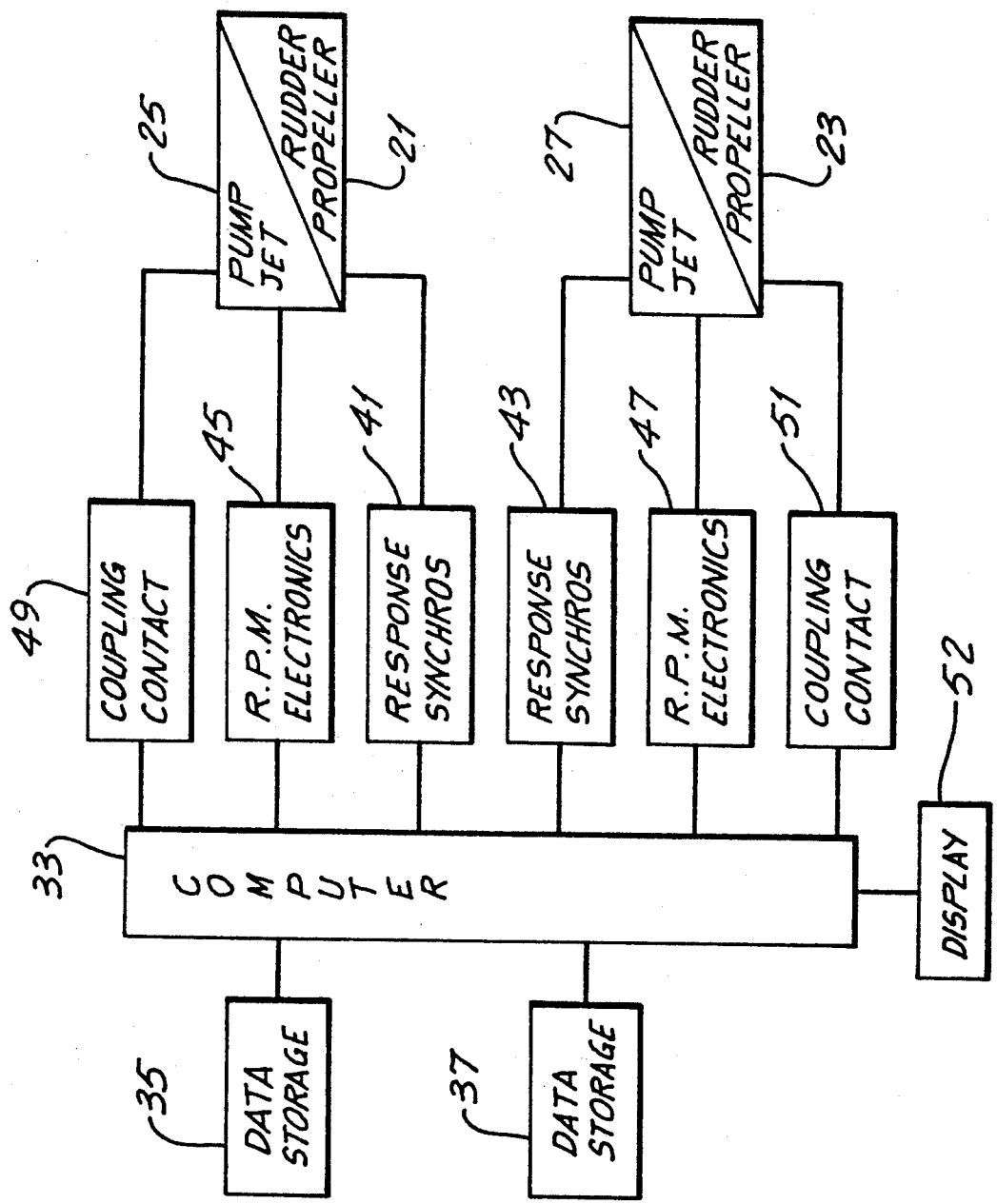
FIG. 6 is a schematic block diagram of the apparatus of the preferred embodiment of the invention.

In FIGS. 1–5 of the drawings, one display panel 52, which is installed in the area occupied by the ship operator, is shown several times. However, the propulsion of the ship is reproduced in different operating states and the sailing conditions of the ship are shown correspondingly different locations. The display panel 52 is a so-called liquid crystal display, and is intended for a ship which is propelled and can be controlled by means of two rubber propellers 21, 23 or pump jets 25, 27. Such ships and such propulsion systems are generally known and need not be explained in greater detail. This is mentioned only as an example of a pump jet propulsion, which is presumed here. The exemplary ship has two such installations, which are offset in a specified manner to the lateral center of gravity of the ship. The symbol for each of the propelling devices on the liquid crystal display 1 is one of the two arrows 2 and 3, the symbol for the ship itself is the filled-in ship's outline 4, and the reference symbol for the ship is a ship's outline 5, which is not filled in and which is fixed in position. The ship's outline 4, which symbolizes the ship itself, is disposed symmetrically on either side of a longitudinal line 6.

To represent the direction of a ship, all the forces that act on it would have to be known. Since the rudder propellers 21, 23 and the pump jets 25, 27 of the type presumed here can exert a force in any direction, the representation of their operating parameters plays a special role. First of all, the angle of the direction of the force (thrust direction) of each propulsion unit of the ship must be determined. This is done by scanning the response synchros 41, 43 of the steering or display electronics which are present, by a computer 33 forming part of the directional indicator of this invention.

Secondly, the amount of force (thrust strength) of each individual propulsion unit is required. In the normal case, the response synchros 41, 43 or the r.p.m. electronics 45, 47 of the propelling engine and the associated coupling contact 49, 51 are evaluated by the computer. It is, however, also possible to install a digital r.p.m. recorder, the pulses of which are converted directly by the computer into an amount of force, on the drive shaft of the respective unit.

Thirdly, the points of attack of the forces in relation to the lateral center of gravity of the ship in data storage 35 and, preferably, some basic dimensions of the ship's hull (length, width, shape of keel, etc.) in data storage 37, should be communicated to the computer. Since all of these values are constant, they are stored permanently in the computer when the directional indicator is installed. As shown in FIG. 1, point of attack data storage 35 and ship's dimension data storage 37 accomplish the storage of that data in the computer 33. Because of the complexity of the determination, the evaluation of extraneous forces (current, wind, etc.) is omitted.

From this data, the following symbols are now portrayed graphically, as shown in the drawing. For control and a better overview, the individual forces of the propulsion units are shown in the lower part of the display. The direction of the arrows 2 and 3 used for this purpose, each of which is assigned to one of the two propelling and steering units (rudder propeller or pump jet) presumed in the case under consideration, gives the thrust direction of the installation. In the shaft of each arrow, a bar presentation is integrated, which corresponds to the r.p.m. of the engine and, with that, to the thrust strength of the installation. The heads of the arrows indicate the coupling state, i.e., whether or not the corresponding pump jet or rudder propeller is engaged or disengaged, an empty head indicating an uncoupled or disengaged state and the filled-in head a coupled or engaged state.

In the upper part of the display, there is shown the actual function of the direction indicator. From the individual forces, the computer calculates the resultant total force according to the laws of the "theory of forces", and represents it in the form of a moving ship 4 (filled-in ship's outline). In order to obtain a better reference to the position at rest of the ship, a solid outline of this ship 5 (ship's outline not filled in) and the path of the lateral point are shown in the starting position as the line 6. So that the direction of slight motions of a ship can also be read readily, the direction display behaves progressively, small forces being represented relatively larger than large forces.

FIG. 1 shows the state of rest of the exemplary ship with two propulsion units disposed in the stern symmetrically to the longitudinal center line of the ship, each unit pointing forward but being in an inactive thrust condition. Without having to think about it for any length of time, this is evident to the ship operator owing to the fact that the filled-in contour or outline 4 of the ship, as a symbol, of the ship, is identical with the reference symbol, in the form of the outline 5 of the ship which is not filled in, and which points in the direction of travel. Also, the two arrows 2 and 3, which are symbols of the propulsion units, point in the thrust direction and are not filled in, thus indicating neither a coupling or engagement state (heads not filled in) nor a force amount (bar presentation) in the shaft of the arrows.

As a further example of the display of an operating state, FIG. 2 shows a resulting motion of the ship, outline 4, relative to the reference symbol 5, and a thrust motion and a lateral displacement at less then full speed ahead, which can be traced back to the operating state of the propulsion units in accordance with the arrows 2 and 3. The propulsion units are coupled or engaged, as indicated by the filled-in arrow heads. Approximately three-quarters of the maximum force possible is applied and this is shown by the bar presentation in the shafts of the arrows. Finally, the direction of the two arrows is parallel, inclined at an angle, lateral towards the front as a symbol of a correspondingly directed thrust-jet emission at the two propulsion units. The ship's lateral point migrates on the line 6, which at the same time symbolizes the travelling direction.

FIG. 3 symbolizes the translatory ship's propulsion from the position of FIG. 1 at maximum speed. The couplings are engaged according to the filled-in arrow heads, the arrow shafts are completely filled in, symbolizing full thrust and the arrows 2 and 3 point in the same direction towards the front, indicating that the jets emerge in the same direction for the translatory forward motion of the ship. The translatory forward motion of the ship is shown as offset in front of the not filled in ship's contour 5, which has remained in position.

In FIG. 4, an operating state of the propulsion system is shown, the objective of which is to turn the ship in place, with the stern swinging out more towards starboard. The port propulsion system (arrow 2) has been shut down and/or is not coupled in or engaged, as is evident from arrow 2, which is not filled in at all. The starboard propulsion system (arrow 3) has a jet-outlet direction towards starboard, bringing the thrust ahead for about half speed and is coupled in or engaged, as can be seen from the filled-in arrow head 3 and the bar presentation in the shaft of the arrow 3. The rear of the ship (symbol 4) is pushed away towards port relative to the reference symbol 5 in order to turn the ship appropriately. The shutdown port propulsion system is turned in a propulsion position towards starboard for the purpose of stopping the turning maneuver.

Finally, in FIG. 5, a maneuver is shown, which, could only be carried out without problems by an experienced ship operator if it were not for the present invention. The ship (symbol 4) is shifted backwards (with the stern in front) with a very slight inclined position relative to the reference symbol. The steering maneuvers for the two propulsion systems can be carried out by observing the arrows 2 and 3 as symbols of the operating strength, and of the direction of action, of the propulsion units and while controlling the ship's motion by observing the motion of symbol 4 relative to the symbol 5.

It is evident that the invention provides a reliable aid for maneuvering a ship with rudder propellers or a pump jet propulsion system, and that even an experienced ship operator would not want to do without such an aid after he has been acclimated to it for some time. Moreover, the equipment of the invention can also be used to advantage as a training device, in order to acquaint ship operators, and make them familiar, with the problems of guiding ships with rudder propellers or pump jet propulsion systems.

We claim:

1. A speed and direction indicator for a ship having first and second drive means, each for steering and propelling said ship, comprising first steering response means operatively connected to said first drive means for producing signals indicative of the steering effect of said first drive means on said ship, second steering response means operatively connected to said second drive means for producing signals indicative of the steering effect of said second drive means on said ship, first propulsion response means operatively connected to said first drive means for producing signals indicative of the propelling effect of said first drive means on said ship, second propulsion response means operatively connected to said second drive means for producing signals indicative of the propelling effect of said second drive means on said ship, computer means operatively connected to said first and second steering response means and to said first and second propulsion response means for computing the resultant steering and propulsion effect of said first and second drive means on said ship, and optical display means operatively connected to said computer means for providing a graphic display of the effect of said first and second drive means on the steering and propulsion of said ship.

2. A speed and direction indicator for a ship according to claim 1 further comprising data storage means operatively connected to said computer means for storing in said computer means data indicative of the dimensions of said ship.

3. A speed and direction indicator for a ship according to claim 1 having one or more additional drive means, further comprising a respective steering response means operatively connected to each of said additional drive means for producing signals indicative of the steering effect of said respective additional drive means on said ship, a respective propulsion response means operatively connected to each of said additional drive means for producing signals indicative of the propelling effect of said respective additional drive means on said ship, each of said additional steering and propulsion response means being operatively connected to said computer means, said computer means computing the resultant steering and propulsion effect of all of said drive means on said ship.

4. A speed and direction indicator for a ship according to claim 1 in which said optical display means shows the angle which is formed between the direction of the resultant of the forces exerted by said drive means on said ship and a reference direction, and the magnitude of said resultant independently of the operating state of each of the individual drive means.

5. A speed and direction indicator for a ship according to claim 1 in which said the direction and magnitude of force of each drive means is determined by said computer means and reproduced in a suitable form on said optical display means by appropriate symbols.

6. A speed and direction indicator for a ship according to claim 5 in which said symbol for the direction of force of each corresponding drive means includes an arrow in outline, the shaft of which is partially filled in to symbolize the force exerted by each respective drive means so as to form a bar presentation.

7. A speed and direction indicator for a ship according to claim 6 wherein the coupling state of each drive means is shown on said optical display means as an arrow head, the uncoupled state being represented by an arrow head that is not filled in, and the coupled state being represented by an arrow head that is filled in.

8. A speed and direction indicator for a ship according to claim 1 wherein signals indicative of the forces applied by each of said drive means are applied to said computer means and the resultant force on said ship is shown as a further symbol on said optical display means.

9. A speed and direction indicator for a ship according to claim 8 wherein said resultant force is represented in the form of an outline of a ship moving in relation to a reference symbol.

10. A speed and direction indicator for a ship according to claim 9 wherein said reference symbol comprises an outline of a ship, the outline of a ship representing the resultant force, being a filled-in outline, and the reference outline of a ship being not filled in.

11. A speed and direction indicator for a ship according to claim 10 wherein each of said propulsion response means comprises a revolutions per minute electronics means for measuring the speed of rotation of said drive means and a coupling contact means for indicating the coupling state of said drive means.

12. A speed and direction indicator for a ship according to claim 1 further comprising data storage means operatively connected to said computer means for storing in said computer means data indicative of point of attack for each of said drive means.

13. A speed and direction indicator for a ship according to claim 12 wherein said data storage means stores and applies to said computer means signals indicative of the point of attack of the forces of said drive means on said ship in relation to the lateral center of gravity thereof, the ship's length, the ship's width and/or the shape of the ship's keel but not extraneous forces from water current and the wind.

* * * * *